US012759267B2

(12) United States Patent
Jouve et al.

(10) Patent No.: US 12,759,267 B2
(45) Date of Patent: Oct. 13, 2026

(54) GLAZING WITH ACTIVE AREAS THE CONTROLS OF WHICH ARE IDENTIFIED BY SIGNS PRODUCED USING DIGITAL PRINTING

(71) Applicant: SAINT-GOBAIN GLASS FRANCE, Courbevoie (FR)

(72) Inventors: Margaux Jouve, Compiegne (FR); Dominique Seignard, Compiegne (FR); Alexia Yon, Chantilly (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 209 days.

(21) Appl. No.: 18/546,548

(22) PCT Filed: Feb. 2, 2022

(86) PCT No.: PCT/FR2022/050193
§ 371 (c)(1),
(2) Date: Aug. 15, 2023

(87) PCT Pub. No.: WO2022/175615
PCT Pub. Date: Aug. 25, 2022

(65) Prior Publication Data

US 2024/0131821 A1 Apr. 25, 2024
US 2024/0227364 A9 Jul. 11, 2024

(30) Foreign Application Priority Data

Feb. 16, 2021 (FR) ....................................... 2101457

(51) Int. Cl.
*B32B 17/10* (2006.01)

(52) U.S. Cl.
CPC .. *B32B 17/10266* (2013.01); *B32B 17/10504* (2013.01); *B32B 17/10513* (2013.01); *B32B 17/10522* (2013.01); *B32B 17/10532* (2013.01)

(58) Field of Classification Search
CPC ................................................ B32B 17/10005
See application file for complete search history.

(56) References Cited

U.S. PATENT DOCUMENTS

2018/0207909 A1* 7/2018 Vivier ............... B32B 17/10293
2019/0263105 A1 8/2019 Briquet
2020/0017023 A1 1/2020 Anderson et al.

FOREIGN PATENT DOCUMENTS

CN 103403652 A 11/2013
CN 108029160 A 5/2018

(Continued)

OTHER PUBLICATIONS

International Search Report as issued in International Patent Application No. PCT/FR2022/050193, dated May 18, 2022.

(Continued)

*Primary Examiner* — Ian A Rummel

(74) *Attorney, Agent, or Firm* — CUSHMAN PARTNERS LLC

(57) ABSTRACT

A glazing, at least partially transparent, the main surface of which is divided into partial surfaces capable of being concealed, opacified, colored and/or illuminated independently of each other, in whole, in part and/or in accordance with designs, the partial surfaces being associated with invisible touch controls identified by prints, an identification design on the one hand, an offset design for identification and tracking of invisible offset touch controls on the other hand, being associated with at least one of the partial surfaces.

18 Claims, 5 Drawing Sheets

(56) References Cited

FOREIGN PATENT DOCUMENTS

| | | | | | |
|---|---|---|---|---|---|
| CN | 109715396 | A | | 5/2019 | |
| GB | 2429431 | A | * | 2/2007 | .............. B41J 3/407 |
| WO | WO 2017/005627 | A1 | | 1/2017 | |
| WO | WO 2017/042508 | A1 | | 3/2017 | |
| WO | WO 2019/077014 | A1 | | 4/2019 | |
| WO | WO 2020/083563 | A1 | | 4/2020 | |

OTHER PUBLICATIONS

First Office Action as issued in Chinese Patent Application No. 202280002095.3, dated Feb. 29, 2024.

* cited by examiner

[Fig. 1]
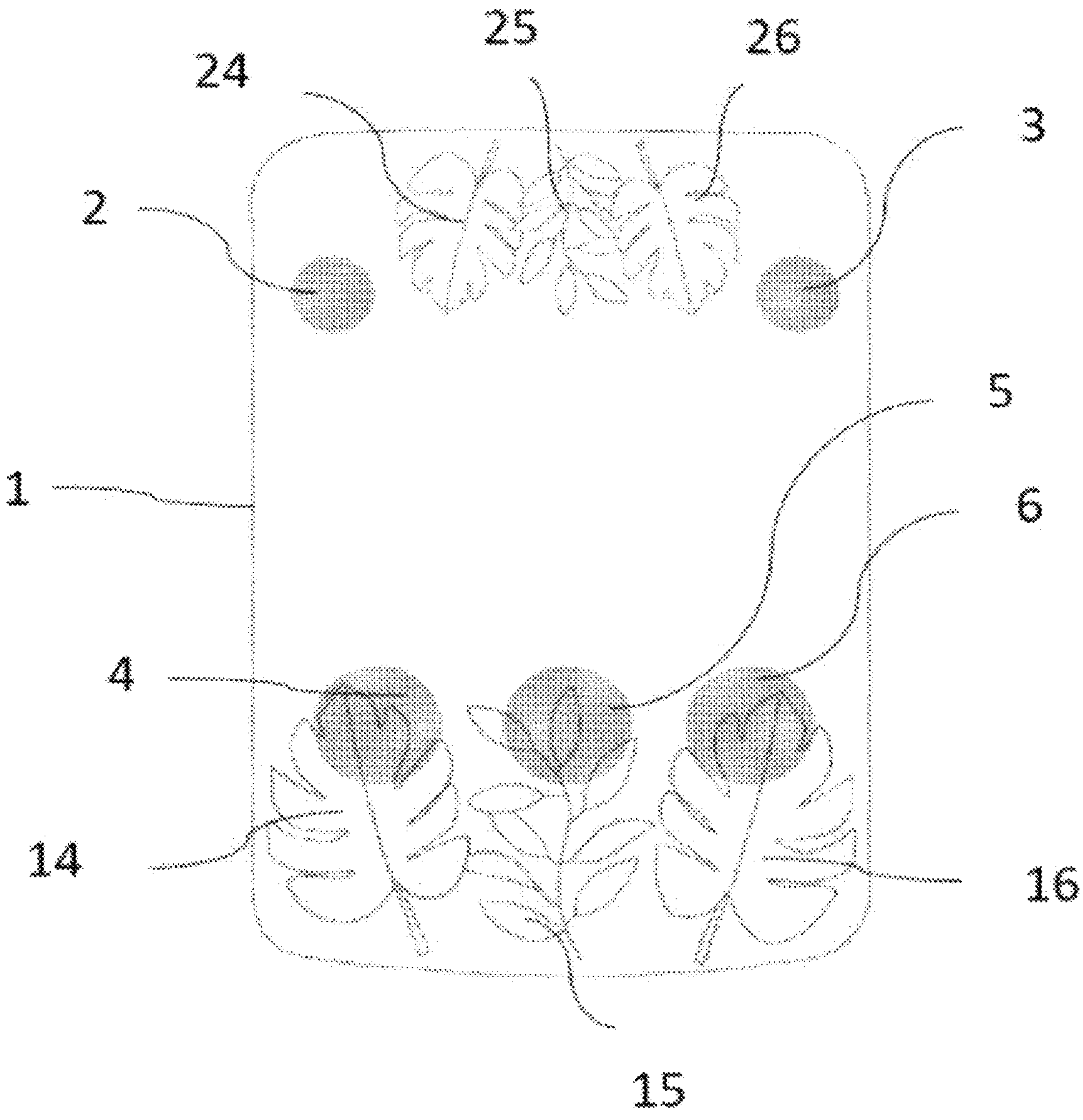

[Fig. 2]
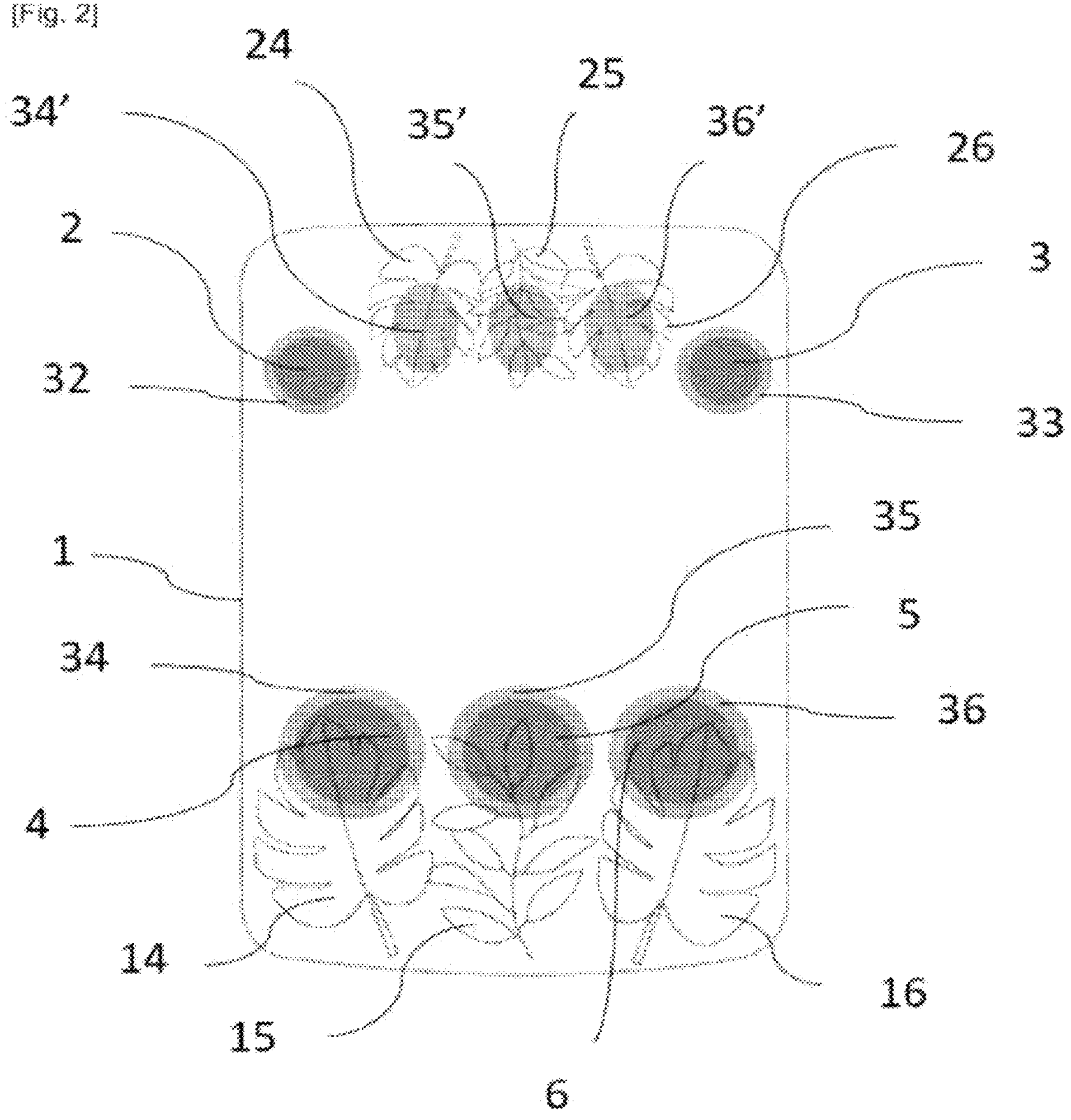

[Fig. 3]
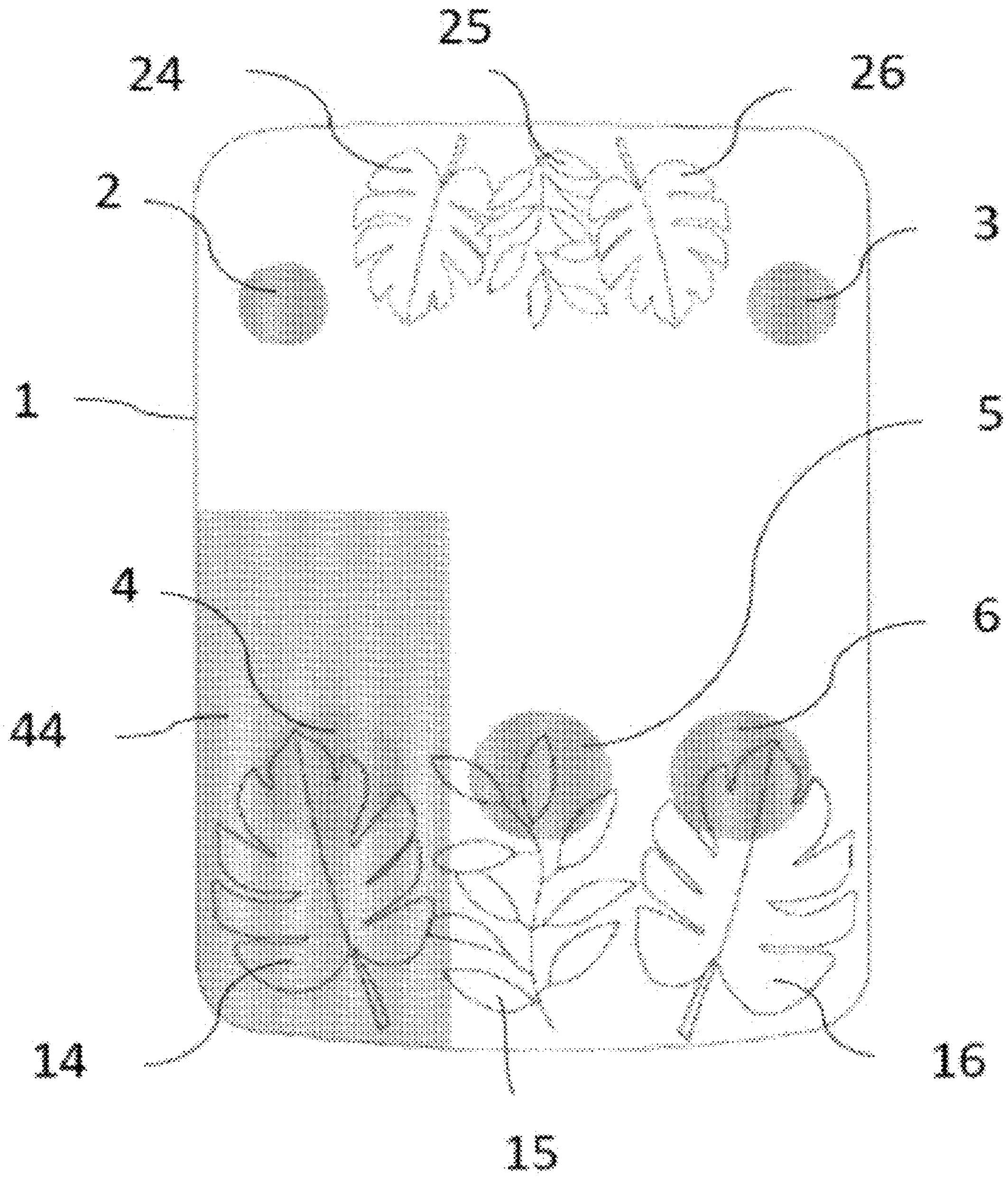

[Fig. 4]
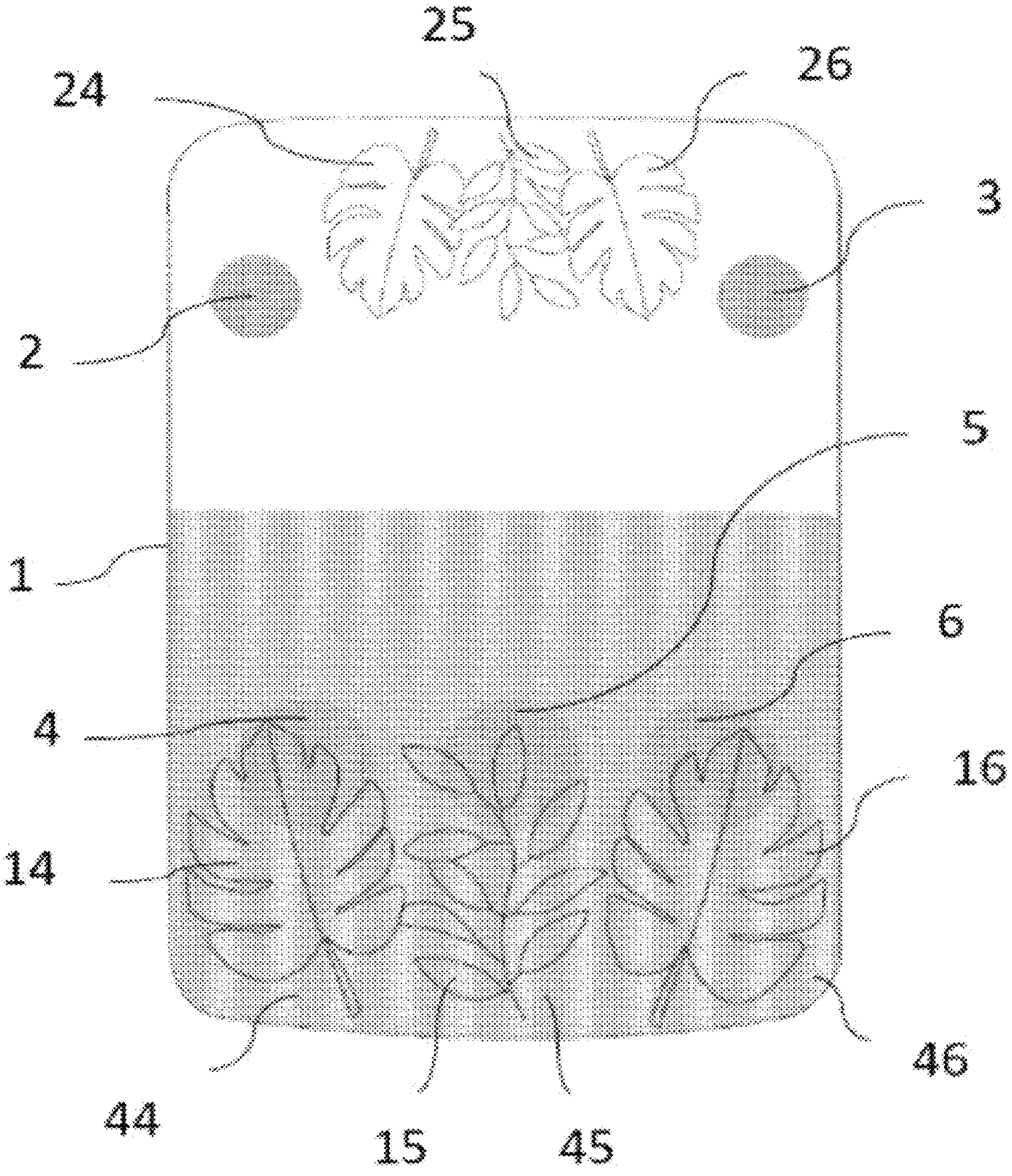

[Fig. 6]
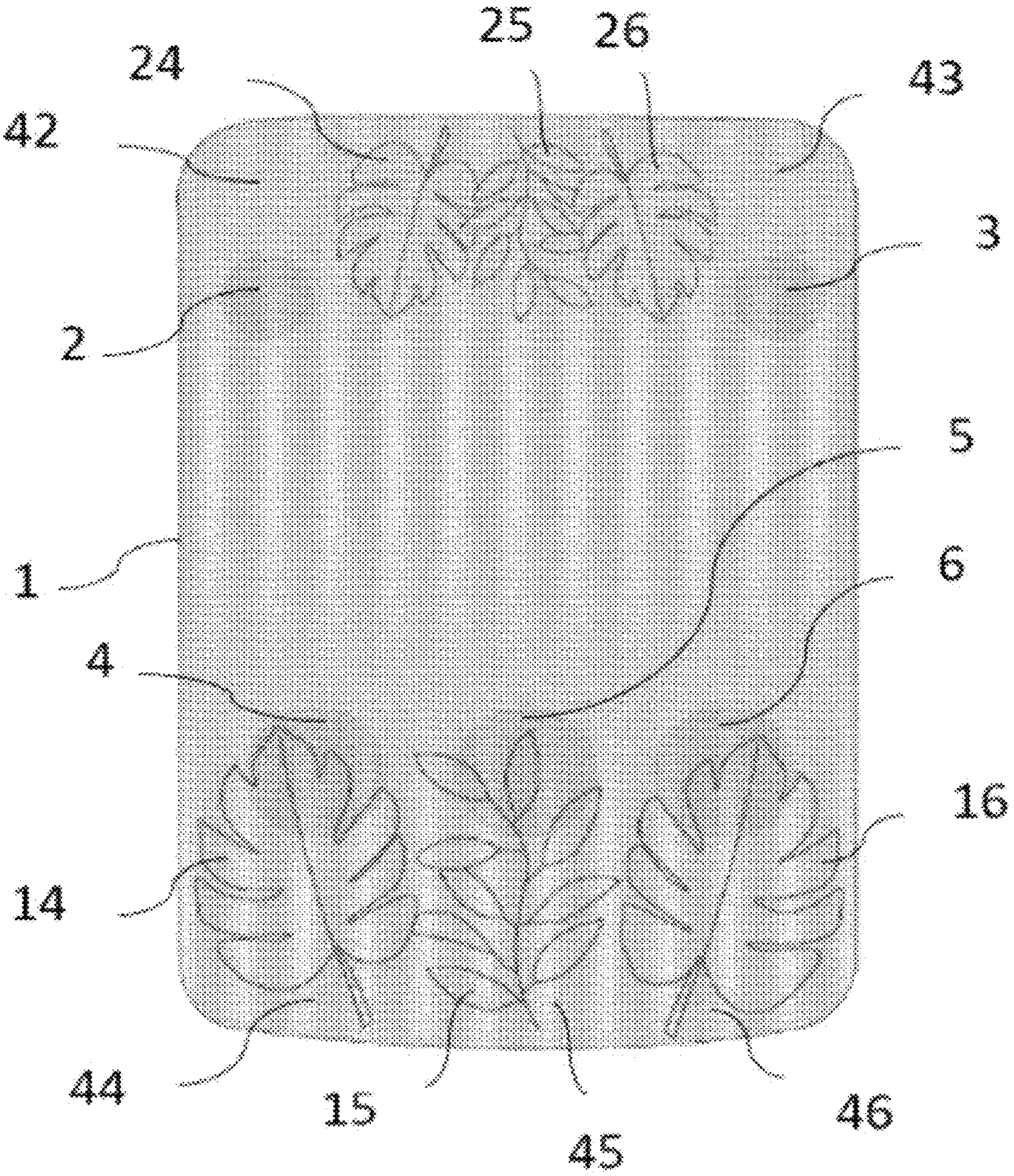

GLAZING WITH ACTIVE AREAS THE CONTROLS OF WHICH ARE IDENTIFIED BY SIGNS PRODUCED USING DIGITAL PRINTING

CROSS-REFERENCE TO RELATED APPLICATIONS

This application is the U.S. National Stage of PCT/FR2022/050193, filed Feb. 2, 2022, which in turn claims priority to French patent application number 2101457, filed Feb. 16, 2021. The content of these applications are incorporated herein by reference in their entireties.

The invention relates to a glazing, that is an at least partially transparent pane, which comprises several active areas the properties of which can be modified independently of each other: transparent, translucent or opaque, of different colors, light-emitting or not, bearing designs or drawings such as those printed, distinctive of a specific area, identifying a functionality or a touch control of a functionality for a specific area. This glazing could be useful both for buildings and for a land, airborne or water vehicle, in particular a motor vehicle. An automotive vehicle roof is targeted in particular.

Advances in printing techniques and apparatuses, such as digital printing on mineral glass or on polymeric material, for example interlayer adhesive for laminated glazing: polyvinyl butyral (PVB), thermoplastic polyurethane (TPU), ethylene-vinyl acetate copolymer (EVA), or organic glass (structural transparent) of poly(methyl methacrylate) (PMMA), polycarbonate (PC), poly(ethylene terephthalate) (PET) or polyurethane (PU) type, open up wider and numerous possibilities for monolithic and laminated glazing, creating functionalities, Human Machine Interface (HMI), as well as new aesthetic effects and aspects.

Consequently, the invention has been created, the purpose of which is an at least partially transparent glazing whose main surface is divided along at least two perpendicular directions into partial surfaces capable of being obscured, opacified, colored and/or illuminated independently of each other, in whole, in part and/or according to designs, characterized in that the partial surfaces are associated with invisible touch controls identified by means of prints.

There is at least one line of each of said at least two perpendicular directions, which separates at least two said partial surfaces (at least their quasi-totality).

Preferably, an identification design is associated with at least one of the partial surfaces. In this case, an offset design for identification and tracking of invisible offset touch controls, for a functionality of said at least one of the partial surface(s) with which an identification design is associated, is also associated with said at least one of the partial surface(s). The offset identification design evokes the identification design of the area; it looks like it, conforms to it, optionally constitutes its transformation by homothety, reduction of dimensions for example, and symmetry, so that the user understands that the touch control is that of a functionality for the matching area (partial surface).

In a first embodiment, the glazing is monolithic in mineral glass such as soda-lime float, aluminosilicate, borosilicate, optionally hardened or tempered thermally or chemically reinforced, or in organic glass, that is in transparent structural polymer material: poly(methyl methacrylate) (PMMA), polycarbonate (PC), poly(ethylene terephthalate) (PET), polyurethane (PU).

In a second embodiment, the glazing is laminated, that is made up of several sheets of glass bonded two by two consecutively by an adhesive interlayer: polyvinyl butyral (PVB), thermoplastic polyurethane (TPU), ethylene-vinyl acetate copolymer (EVA).

Preferably, the partial surfaces comprise functional films based on liquid crystals encapsulated, or dispersed in a polymer matrix (PDLC), of electrophoretic particles dispersed in a medium, of particles dispersed in an electrophoretic fluid or comprising a film of suspended particle device (SPD) or a laminate of such a film, or an electrochromic system, or a scattering enamel capable of extracting light from a light-emitting diode (LED) positioned on the edge of the glazing.

Functional films based on liquid crystals dispersed in a polymer matrix are known by the abbreviation PDLCs. Liquid crystals dispersed in a polymer matrix are a category of heterogeneous materials consisting of a dispersion of microdroplets of liquid crystals in a solid and more or less flexible polymer matrix. These materials exhibit electrooptical properties. They can in fact switch between a highly diffusive opaque state (OFF state) and a transparent state (ON state) following the application of an electric field.

The PDLC system is employed in switchable windows. It has several advantages such as ease of manufacture, ease of large-scale utilization, stability, speed of their response time and the fact of not requiring the use of polarizers that absorb almost half of the incident light.

Different mesophases can be used to prepare these materials: the nematic phase, the cholesteric phase and the A and C* smectic phases.

The principle of electro-optical systems using a PDLC consists of a composite sandwiched between two electrodes made of glass plates, one side of which is covered with a conductive and transparent layer of indium tin oxide (ITO). In the absence of an electric field, the mean orientation of the liquid crystal molecular directors is random. The difference in refractive index between the segregated liquid crystal and the macromolecular matrix results in a material with a milky and opaque appearance and that will scatter the light (OFF state).

During the application of an electric field between the electrodes of the cell, the molecular directors become oriented in the direction of the field. A beam of normal index passes through the droplets with a refractive index equal to $n_0$, the ordinary index of liquid crystal molecules. If this index is close to that of the polymer matrix, the film appears clear and transparent (ON state).

It is also possible to use a film containing encapsulated particles dispersed in a suspension fluid or electrophoretic fluid. Said fluid can be a mixture of two or more than two fluids or else a single fluid. Furthermore, these particles can themselves contain a liquid and be dispersed in a suspension fluid. In any case, the suspension fluid can have a density or a refractive index, the values of which are substantially suited to those which characterize the particles dispersed in the fluid. They can in particular be colored polymer particles preferably having a surface functionality of charge retention. In electrophoretic media, it is advantageous to use pigment particles comprising polymer shells comprising from 0.1 to 5 percent in moles of repeat units resulting from a fluorinated acrylate monomer or from a fluorinated methacrylate monomer. The polymer specifically has a branched-chain structure, with side chains which extend from a main chain.

The conductive fluid may be colored. It can comprise a polar solvent and a colorant chosen from a pigment and/or a dye. The colored conductive fluid should not cause electrical failure of a dielectric in the device in which it is employed. An agent for controlling electrical conductivity can optionally be added to the colored conductive fluid.

The application of electric fields in a glazing, provided with such a film, by electrophoresis makes it possible to influence the optical properties of said glazing.

A suspended particle device (SPD) film comprises substrates coated, on at least a portion of their inner surface, (i) with a conductive polymer such as, for example, polythiophene or (ii) with an inorganic conductive layer such as, for example, indium tin oxide, to act as electrode means. The polymer can be applied in the form of an aqueous composition comprising, in addition to the polymer, at least one solvent and at least one binder. A preferred conductive polymer based on polythiophene is a polyethylenedioxythiophene (PEDT) polymer. The polymer can be doped with polystyrenesulfonate. The polymer electrodes can be connected to a conductive material which extends beyond an external limit of the film to connect the film to an appropriate voltage source.

Mention may also be made of the films which comprise a polymer matrix and exhibit droplets of a liquid light-modulating suspension containing a plurality of particles dispersed in a liquid medium in suspension distributed within the matrix. Said medium in suspension (a) is virtually immiscible with the polymer matrix, (b) has, at atmospheric pressure, a boiling point greater than approximately 100° C., (c) has an electrical resistivity of at least approximately $0.8\times10^6$ ohms per square and (d) has a refractive index at 25° C. which differs by not more than approximately 0.002 from that of the polymer matrix, measured at virtually the same temperature. The suspension medium includes at least one liquid compound selected from the group encompassing methylpyrrolidinone, ethylpyrrolidinone, dimethyl malonate, diethyl malonate, dimethyl succinate, di(propylene glycol) methyl ether, dimethylphthalate, butyl phthalyl butyl glycolate, ethyl lactate, propylene carbonate, dimethyl perfluorosuberate, dimethyl tetrafluorosuccinate, tetra(ethylene glycol) dimethyl ether, tri(ethylene glycol) dimethyl ether, di(ethylene glycol) dimethyl ether, ethylene glycol phenyl ether, epoxidized linseed oil, epoxidized soybean oil, diethyl isophthalate, a laurate ester based on silicone copolyol, a copolymer of silicone copolyol, an ester of silicone copolyol, an isostearate ester based on silicone copolyol, a pelargonate ester based on silicone copolyol, diethyl isophthalate, dimethyl octafluoroadipate and also corresponding mixtures and, optionally, at least one previously known liquid suspension medium. The polymer matrix can optionally be crosslinked to form the film in order to produce a crosslinked polymer matrix.

Such a film with a suspended particle device is suitable for utilization as a light modulator for a laminated glazing according to the invention.

In addition, an electrochromic system comprises electroconductive layers, separated by a layer of an electrochromic material, an electrolyte and a counter electrode, said electroconductive layers each being provided with an electroconductive strip made of a material whose electrical conductivity is high compared to that of the electroconductive layers, the electroconductive strips being arranged along opposite edges of the glazing and connected to a voltage generator that applies in the coloring phase (or respectively in the discoloring phase), between two points A and B belonging respectively to the electroconductive layers and in the immediate vicinity of the electroconductive strips, a potential difference. Advantageously, the electroconductive strips are made of copper and are welded to the conductive electrode as defined above, the layer of an electrochromic material consists of a cathodic electrochromic material such as, for example, tungsten trioxide, the counter electrode consists of an anodic electrochromic material such as, for example, iridium oxide, and/or the electrolyte is a proton-conducting electrolyte such as, for example a polymeric complex of polyethylene oxide and orthophosphoric acid that is anhydrous, or a lithium ion or proton ($H^+$) conducting electrolyte.

Mention may thus be made, for example, of viologens and conductive polymers, such as polyaniline or PAni.

In comparison with standard laminated glazings, the electrically switchable glazing provides specific additional functions that translate into user comfort, light transmission and energy savings. The switchable glazing can rarely be installed directly as a finished product. Typically, before use of the switchable glazing, a prelamination is necessary. For example, for the utilization of a SPD film at the frame of the sunroof of an automotive vehicle, it is necessary to produce a laminate between at least 2 sheets of clear glass or glass tinted with PVB. This is done in order to meet the safety standards in the event of the glass breaking and to extend the lifetime of the SPD film.

A scattering enamel capable of extracting light from a light-emitting diode (LED) positioned on the edge of the glazing, forms, for example, a pattern whereby light of any selected color is extracted.

The invention also has as a purpose a method for producing a glazing described above, characterized in that said identification designs and said offset identification designs are produced using digital printing, and said prints are produced by screen printing, or conversely said identification designs and said offset identification designs are produced using screen printing and said prints are produced using digital printing, or else said identification designs, said offset identification designs and said prints are all produced using digital printing.

According to a preferred characteristic of the method of the invention, the glazing is a laminated glazing with two sheets of inorganic or organic glass bonded by an adhesive interlayer, the faces of the two sheets of glass are conventionally numbered 1 for the face intended to be in contact with an exterior space to 4 for the face intended to be in contact with an interior volume, in so far as each digital printing is carried out on one of the faces 2, 3 or 4 thus defined, and each screen printing is carried out on glass or on an interlayer.

Preferably, the identification designs and the offset identification designs are then produced using digital printing on face 3 and the prints are produced using screen printing on glass on face 4.

According to an advantageous variant of this method, at least one of the identification designs, the offset identification designs and the prints comprise a digital printing ink or a scattering silkscreen enamel, so that light-emitting diodes (LEDs) lit and positioned on the edge of the glazing (1) make it (or them) luminous, and that they remain visible when the LEDs are off.

Preferably, the invisible touch controls and the invisible offset touch controls consist of a conductive film that is laminated between two interlayer adhesive sheets, one of which has a thickness at most equal to 0.2, preferably 0.1 mm, and in direct contact with the face of the glass sheet opposite to that whereupon the touch functionality is exerted. In a laminate with two sheets of glass, the touch functionality acting on the inner face of the laminate in contact with the automotive passenger compartment, the inner face conventionally numbered face 4, the interlayer adhesive sheet with a thickness at most equal to 0.2 mm is therefore in direct contact with face 3 of the laminate. A lamination such as interior glass/thin PVB/touch film/classic PVB/exterior glass is then used.

Another purpose of the invention consists in the utilization of a glazing described above as glazing for buildings, or for a land, airborne or water vehicle, in particular as an automotive vehicle roof.

The invention will be better understood in the context of the following description of the appended drawings, in which FIG. 1 is a front view of a glazing according to the invention whose functional partial surfaces are inactive.

FIG. 2 is the same view as FIG. 1, whereupon invisible features have been depicted for explanatory purposes.

FIG. 3 is the same view as FIG. 1, but in which a functional partial surface has been activated.

FIG. 4 is the same view as FIG. 1, but in which three functional partial surfaces have been activated.

FIG. 5 is the same view as FIG. 1, but in which five functional partial surfaces have been activated.

Referring to FIG. 1, the glazing 1 consists of two sheets of float glass, one in chemically reinforced aluminosilicate and intended to be in contact with the outside atmosphere, the other in heat-hardened soda-lime glass. The two sheets of glass are bonded together by an adhesive interlayer made from polyvinyl butyral (PVB), which will be discussed in more detail below. Glazing 1 is an essentially transparent motor vehicle roof.

Prints 2, 3, 4, 5 and 6 for the tracking of invisible touch controls not shown, but which will be discussed below, are produced by screen printing on the inside face of the laminated glazing, conventionally numbered Face 4, particularly the concave face of the glazing if it has a convexity intended to be oriented towards the outside atmosphere. Each print is located above a matching touch control, at a location easily accessible by the occupant of a motor vehicle, of a partial surface, not shown, of the glazing 1 under which the occupant is located, and which will be disclosed below. Each touch control makes it possible to activate the partial surface whereupon the matching print 2, 3, 4, 5 or 6 is located.

Identification designs 14, 15 and 16 are produced by digital printing on Face 3 of the laminated automotive vehicle roof 1, that is the internal face of the laminated structure of the glass sheet in contact with the passenger compartment of the automotive vehicle. Each design 14, 15 and 16 is printed on the partial surface 44, 45 and 46, it symbolizes. Referring to FIGS. 3, 4 and 5, these partial surfaces 44, 45 and 46 overhang the rear left, middle and right passengers, while the partial surfaces 42 and 43 overhang the front left and right passengers.

An enamel of any color is formed by digital printing from a colored ink comprising at least one glass frit, inorganic pigments, solvents and an organic binder, the glass frit and the pigments having a particle size distribution by volume such that the D90 value is at most 2 μm, and the viscosity of the ink is between 1 and 50 mPa·s.

Offset identification designs 24, 25 and 26 are also produced by digital printing on Face 3 of glazing 1. They recall, by symmetry-homothety, the identification designs 14, 15 and 16, and symbolize, like these, the partial surfaces 44, 45 and 46, without being located on them, but on the opposite side of automotive vehicle roof 1.

Referring to FIG. 2, the invisible touch controls 32, 33, 34, 35 and 36 are depicted, identified by the prints 2, 3, 4, 5 and 6, as well as the offset touch controls 34', 35' and 36' identified by the offset identification designs 24, 25, 26. By touching the prints 2, 3, 4, 5, respectively 6, the occupant activates the function (such as opacification-concealment) of the partial surface 42, 43, 44, 45, respectively 46 of the automotive vehicle roof 1 that overhangs it. By touching the offset identification designs 24, 25, respectively 26, the front left or right occupant activates the function of the partial surface 44, 45, respectively 46 of the automotive vehicle roof, for the occupant of the rear left, middle, respectively right.

The touch controls 32, 33, 34, 35 and 36, and the offset touch controls 34', 35' and 36' are made using a conductive film of indium tin oxide (ITO) or laminated silver between a polyvinyl butyral (PVB) sheet, 50 μm thick, in direct contact with Face 3 of the laminated glazing and a PVB sheet of usual thickness, such as of the order of 0.38-0.76 mm. A back-electrode is inserted between this last sheet of PVB and face 2 of the laminated glazing to prevent Face 1 of the latter from being touch-sensitive like Face 4.

The invention claimed is:

1. A glazing at least partially transparent comprising a main surface which is divided along to at least two perpendicular directions into partial surfaces capable of being concealed, opacified, colored and/or illuminated independently of each other, in whole, in part and/or conforming to designs, wherein the partial surfaces are associated with invisible touch controls identified by means of prints, wherein the partial surfaces of the glazing comprise a first partial surface and a second partial surface, wherein the second partial surface is associated with a first invisible touch control for controlling concealment, opacification, coloration and/or illumination of the second partial surface, said first invisible touch control being (a) offset from said second partial surface and (b) located in said first partial surface, and a first offset identification print is provided on the glazing in said first partial surface to identify a location of said first offset invisible touch control and to allow actuation of said first offset invisible touch control to operate the second partial surface, and wherein said second partial surface comprises a second invisible touch control for also controlling concealment, opacification, coloration and/or illumination of the second partial surface and a second identification print to identify a location of said second invisible touch control.

2. The glazing according to claim 1, wherein the second partial surface further comprises an identification design comprising a printed marking that is different from that said second identification print.

3. The glazing according to claim 1, wherein the glazing is monolithic in mineral or organic glass.

4. The glazing according to claim 1, wherein the glazing is laminated.

5. The glazing according to claim 1, wherein the partial surfaces comprise functional films based on liquid crystals encapsulated, or dispersed in a polymer matrix (PDLC), of electrophoretic particles dispersed in a medium, of particles dispersed in an electrophoretic fluid or comprising a suspended particle device (SPD) film or a laminate of such a film, or an electrochromic system, or a scattering enamel capable of extracting the light from a light-emitting diode (LED) positioned on the edge of the glazing.

6. The glazing according to claim 2, wherein the first offset identification print located in said first partial surface has a same graphical design as the identification design associated with the second partial surface, so that a user visually associates the first offset invisible touch control with the second partial surface.

7. The glazing according to claim 6, wherein the first offset identification print located in said first partial surface is a reproduction of the identification design located in said second partial surface by homothety with reduced dimensions relative to the identification design.

8. The glazing according to claim 6, wherein the first offset identification print located in said first partial surface is a symmetric reproduction of the identification design located in said second partial surface.

9. The glazing according to claim 6, wherein the first offset identification print located in said first partial surface conforms in outline to the identification design located in said second partial surface, thereby evoking the identification design of the second partial surface to indicate that the first offset invisible touch control operates the second partial surface.

10. The glazing according to claim 6, wherein the first offset identification print located in said first partial surface and the identification design located in said second partial surface are produced by digital printing on a glass face of the glazing, and the first offset identification print is disposed on an inner face of the glazing.

11. A method for producing a glazing according to claim 6, comprising producing said identification design located in said second partial surface and said first offset identification print located in said first partial surface using digital printing, or screen printing.

12. The method according to claim 11, wherein the glazing is a laminated glazing with two sheets of mineral or organic glass bonded by an adhesive interlayer, wherein faces of the two sheets of glass are conventionally numbered from 1 for the face intended to be in contact with an external space to 4 for the face intended to be in contact with an internal volume, and wherein each digital print is produced on one of the faces 2, 3 or 4 thus defined, and each screen print is produced on glass or on an interlayer.

13. The method according to claim 12, wherein the identification design is produced using digital printing on face 3 and the offset identification print is produced using screen printing on glass on face 4.

14. The method according to claim 11, wherein light-emitting diodes (LEDs) lit and positioned on the edge of the glazing make the identification design located in said second partial surface or the first offset identification print located in said first partial surface luminous, and wherein the identification design or the first offset identification print remains visible when the LEDs are off.

15. The method according to claim 12, wherein the first invisible touch control and first offset touch control consist of a conductive film that is laminated between two interlayer adhesive sheets, one of which has a thickness at most equal to 0.2 and in direct contact with a face of the opposite sheet of glass to that whereupon the touch functionality is exercised.

16. A method comprising providing a glazing according to claim 1 as a glazing for a building, or for a land, airborne or water vehicle.

17. The method according to claim 16, wherein the glazing is an automotive vehicle roof.

18. The method according to claim 15, wherein the thickness is at most 0.1 mm.

* * * * *